United States Patent [19]

Engle

[11] Patent Number: 5,488,505
[45] Date of Patent: Jan. 30, 1996

[54] ENHANCED ELECTROSTATIC SHUTTER MOSAIC MODULATOR

[76] Inventor: Craig D. Engle, 336 Cline Ave., Griffith, Ind. 46319

[21] Appl. No.: 955,058

[22] Filed: Oct. 1, 1992

[51] Int. Cl.⁶ ................................................. G02F 1/29
[52] U.S. Cl. ........................... 359/292; 359/295; 348/759
[58] Field of Search ................................. 359/292, 295, 359/279; 358/62, 233

[56] References Cited

U.S. PATENT DOCUMENTS

| | | | |
|---|---|---|---|
| 2,644,208 | 7/1953 | Auphan | 22/190 |
| 2,670,523 | 3/1954 | Orthuber et al. | 29/25.17 |
| 2,681,380 | 6/1954 | Orthuber | 178/5.4 |
| 2,681,423 | 6/1954 | Auphan . | |
| 2,682,010 | 6/1954 | Orthuber | 315/3 |
| 2,733,501 | 2/1956 | Orthuber et al. | 29/25.17 |
| 3,463,572 | 8/1969 | Preston | 359/295 |
| 3,654,606 | 4/1972 | Marlowe et al. | 340/166 |
| 3,746,911 | 7/1973 | Nathanson et al. | 315/21 R |
| 3,796,480 | 3/1974 | Preston et al. | 359/295 |
| 3,886,310 | 5/1975 | Guldberg et al. | 178/7.5 D |
| 3,896,338 | 7/1975 | Nathanson et al. | 315/373 |
| 4,229,081 | 10/1980 | Jones et al. | 350/361 |
| 4,441,791 | 4/1984 | Hornbeck . | |
| 4,592,628 | 6/1986 | Altman et al. | 350/486 |
| 4,694,287 | 9/1987 | Chenevas-Paule et al. | 359/59 |
| 4,710,732 | 12/1987 | Hornbeck | 332/7.51 |
| 4,731,610 | 3/1988 | Baron et al. | 340/784 |
| 4,956,619 | 9/1990 | Hornbeck | 330/4.3 |
| 5,099,353 | 3/1992 | Hornbeck | 359/291 |
| 5,142,405 | 8/1992 | Hornbeck | 359/226 |

OTHER PUBLICATIONS

"Integrated Circuits" in Encyclopedia of Semiconductor Technology (1984), pp. 369–371, Ref.TK7871.85, 1984.
Robert E. Brooks, Micromechanical Light Modulators on Silicon, Optical Engineering/Jan./Feb. 1985/vol. 24 No. 1, 101.
Craig D. Engle, Enhanced Surface Deformation Light Modulator, Ser. No. 07/953118, mailed Sep. 26, 1992.
D. Hulsenberg and R. Bruntsch, Glass and Glass Ceramics for Application in Micromechanics, Journal of Non–Crystalline Solids, 129 (1991) 199–205.
John van Raalte, Reflective Liquid Crystal Television Display, Proceedings of the IEEE, vol. 56, No. 12, Dec. 1968.
R. T. Howe, Polycrystalline Silicon Microstructures, Micromachining and Micropackaging of Transducers, edited by C. D. Fung et al.
Bernard J. Lechner et al, Liquid Crystal Matrix Displays, Proceedings of the IEEE, vol. 59, No. 11, Nov. 1971.
P. G. LeComber, Present and Future Applications of Amorphous Silicon and It's Alloy, Journal of Non–crystalline Solids 115 (1989) 1–13.

*Primary Examiner*—F. Daniel Lopez
*Attorney, Agent, or Firm*—Wood, Phillips, VanSanten, Clark & Mortimer

[57] ABSTRACT

An electrostatic shutter mosaic modulator contains a substrate, said substrate contains a first face and a second face. A plurality of first electrodes are arranged in a matrix of p rows an q columns. Each first electrode is affixed to the substrate by a suitable means. Each first electrode is overlapped by a respective deformable reflective conductor. Each conductor is affixed to the first face by a suitable means. Every conductor in each column is electrically connected by a respective column buss. Each first electrode is electrically connected to a respective third switch terminal of a respective switching element by a suitable feedthrough means. Each switching element is affixed by a suitable means to the second face. Each first electrode overlapps the respective switching element. A suitable means is provided to control the potential difference between each first electrode and the respective conductor, in accordance with an information bearing signal. The potential difference influences a deformation in the respective conductor, thereby enabling a wavefront incident on the modulator to be phase modulated in accordance with the information bearing signal.

17 Claims, 2 Drawing Sheets

ENHANCED ELECTROSTATIC SHUTTER MOSAIC MODULATOR

BACKGROUND OF INVENTION

This invention relates to construction and addressing of deformable mirror devices.

BACKGROUND—PRIOR ART

The terminology "electrostatic shutter mosaic" was utilized in U.S. Pat. No. 2,681,380 to R. K. Orthuber, Jun. 15, 1954, to describe a deformable mirror device which was electron beam addressed. U.S. Pat. No. 2,682,010 to R. K. Orthuber, Jun. 22, 1954 describes a related device. Method of fabricating and affixing metalized deformable mirrors, referred to as flaps, are provided in U.S. Pat. No. 2,670,523 to R. K. Orthuber et al, Mar. 2, 1954 and U.S. Pat. No. 2,733,501 to R. K. Orthbuer et al, Feb. 7, 1956. Alternative techniques to fabricate deformable mirrors is provided in U.S. Pat. No. 2,644,208 to M. Auphan, Jul. 7, 1953. Complications associated with electron beam addressing of deformable mirror devices include a vacuum environment, packaging requirements, and high voltages. As identified in the article "Micromechanical Light Modulators on Silicon" by Robert E. Brooks, Optical Engineering, January/February 1995, Vol. 24, No. 1, the conversion of electronic data into optical form should occur, preferably, without the requirement of high voltage.

Several additional electron beam addressed deformable mirror devices exist. Examples include U.S. Pat. No. 4,592,628, to Altman et al, Jun. 3, 1986, U.S. Pat. No. 3,746,911, to Nathanson et al, Jul. 17, 1973, U.S. Pat. No. 3,886,310 to Guldberg et al, May 27, 1975, and U.S. Pat. No. 3,896,338, to Nathanson et al, Jul. 22, 1975. These patent suffer from the same limitations identified with U.S. Pat. No. 2,681,380. Additional complications of electron beam addressed configurations are identified in U.S. Pat. No. 4,710,732 to Hornbeck, December 1987 and U.S. Pat. No. 4,956,619 to Hornbeck, Sep. 11, 1990.

In U.S. Pat. No. 4,710,732 a particular fabrication sequence for use with deformable mirror devices is defined, and represents a sequence which is compatible with integrated display technology. Presumably, this fabrication sequence was optimized for front side components. As previously identified, electrostatic shutter elements could be affixed to insulating substrates. As to be shown herein, shutter mosaics could be interfaced with backside electronics. Backside addressing components could be added to a substrate after front side fabrication of the shutter elements. As such, fabrication sequences other than those claimed by U.S. Pat. No. 4,710,732 could be utilized with matrix addressed deformable mirror devices. I believe, as claimed, any of the configurations defined in U.S. Pat. No. 4,710,732 could be utilized with the backside integrated device of my invention.

In addition, it is contended that U.S. Pat. No. 4,229,081 to Jones et al, Oct. 21, 1980 was the first device to utilize metalized deformable mirrors fabricated on a substrate containing electronic addressing circuitry. As quoted from the article, "Moreover, although the leaves have been described as metalized plastic, they may be made of metal, but with a reduced life expectancy, since metals do not have the long-term elasticities of long chain polymers such as plastics." Although this device is addressed optically, as clearly identified in the first claim, the substrate produces an electronic charge image. It is contented that use of electrodes affixed to this substrate, and the fact that this substrate generates an electron charge distribution to address each individual mirror, qualifies this device as the first metalized deformable mirror device to be fabricated on a substrate containing electronic addressing circuitry.

As to be shown herein, use of backside electronic components introduces several degrees of freedom when fabricating deformable mirror devices. This is an important consideration for improving yield of deformable mirror devices. As identified in U.S. Pat. No. 5,099,353 to Hornbeck, Mar. 24, 1992, the CMOS chip surface of prior art contains several processing artifacts that can lead to reduced yield for deformable mirror devices. Having a fabrication sequence which is amendable to modifications could enhance yield, and improve other areas of performance. For instance, fatigue concerns of metalized mirrors has already been mentioned. To address these concerns, deformable mirror devices could be operated in a bidirectional mode. See for instance U.S. Pat. No. 5,142,405 to Hornbeck, Aug. 25, 1992. Due to fabrication flexibility available with the backside electronics interface of my invention, several material and processing options could be considered when attempting to enhance performance capabilities of deformable mirror devices. The fabrication flexibility inherent with my invention is an important advantage over prior art. As identified in the patent application submitted by Craig D. Engle, titled "Enhanced Surface Deformation Light Modulator," filed Sep. 29, 1992, Ser. No. 07/953,118, U.S. Pat. No. 2,681,423 to Auphan identifies several different reflective conductor embodiments which could be utilized in electrostatic light modulators. As stated in the objectives of Auphan, "It is another object of the present invention to provide a light reflecting screen consisting of strips which are not insulated from one another." As to be shown herein, such a constraint could adversely effect reliability of electrostatic light modulators which are addressed with thin film transistors.

U.S. Pat. No. 3,798,620, Mar. 19, 1974 to Cosentino utilizes a monolithic electrode affixed to a first surface of an insulating substrate and switching elements affixed to the second surface of the substrate. The electrode configuration of U.S. Pat. No. 3,798,620 does not eliminate electrical crossover networks and actually increases the number of bonding operations associated with affixing switching elements to the second surface of the substrate by transferring the electrical crossover network requirement to the semiconductor interface component. As to be shown herein, more desirable alternatives exist.

In addition, transferring the electrical crossover requirements to the electronic interface component hinders integration of alternative switching elements since the semiconductor components must have a packaging configuration which can accommodate the crossover buss.

As to be shown herein, my invention does not require the column conductors to have the same electric potential as in prior art implementations. This latitude is essential for enhancing reliability and other considerations of the modulator. Eliminating the requirement for electrical crossover networks would eliminate the need for semiconductor interface components to incorporate packaging considerations to support electrical crossover networks. Eliminating electrical crossovers enhances reliability and also facilitates integration of thin film transistors, since extraneous packaging requirements could adversely effect thin film transistor yield and the ability to integrate thin film transistors with electrostatic light modulators.

Since the embodiments of U.S. Pat. No. 2,681,423 to Auphan where known prior to U.S. Pat. No. 3,798,620 to Cosentino, and Cosentino failed to utilize the advantages of my invention to eliminate electrical crossover networks, evidently the advantages of my invention where not previously appreciated by those knowledgeable in the state of the art. As to be shown herein, my invention teaches away from prior art.

As identified in application Ser. No. 07/953,118, thin film transistors affixed to an insulating substrate provides latitude in specifying interface components. Such latitude is fundamental to enhancing speed of response of electrostatic light modulators. As identified in the references provided herein, several electrostatic light modulators configured for use in electronic to optical data conversion applications utilize substrate materials which hinders the modulator from utilizing the speed of response intrinsic to reflective conductors. By failing to recognize the fundamentally different electrical and/or mechanical aspects inherent to the various embodiments of U.S. Pat. No. 2,681,423 to Auphan, prior art lacks the necessary implementations to enhance reliability and/or to fully utilize the speed of response intrinsic to reflective conductors in such applications. Such considerations could be important in sub frame addressing.

As identified in application Ser. No. 07/953,118, U.S. Pat. No. 4,694,287 is precluded from functioning as an electrostatic light modulator. If additional components are added to U.S. Pat. No. 4,694,287 to incorporate the electrode structure of U.S. Pat. No. 4,694,287 into an electrostatic light modulator configuration, the resulting configuration suffers from several complications. Complications include that each electrode, identified with an E in U.S. Pat. No. 4,694,287, and the respective transistor electrically connected to each electrode are affixed to the same surface of a first substrate. This prevents each electrode form overlapping the respective transistor.

As identified in application Ser. No. 07/953,118, if each electrode does not overlap the respective transistor, the modulator could suffer from a reduced modulation efficiency. As to be shown herein, my invention could utilize both major surfaces of a substrate to allow each electrode to overlap the respective transistor to enhance modulator efficiency.

Additional complications associated with adding components to U.S. Pat. No. 4,694,287, so U.S. Pat. No. 4,694,287 could function in an electrostatic light modulator configuration, include a reduced modulator efficiency due to capacitate voltage division. As identified in application Ser. No. 07/953,118, the evolution of the Deforgraphic Display tube suggests that techniques to enhance modulator efficiency are not obvious.

Additional electrostatic light modulators examples exist and include U.S. Pat. No. 3,463,572 to K. Preston Aug. 26, 1969. U.S. Pat. No. 3,463,572 is optically addressed. As well understood by those knowledgeable in the state of the art, optical addressing of electrostatic light modulators employed in electronic to optical data conversion applications could adversely effect signal quality due to unnecessary signal transformations required to optically address such a device. Consequently, optically addressed spatial light modulators are deemed undesirable for use in electronic to optical data conversion applications.

OBJECTS AND ADVANTAGES

Accordingly, several objects and advantages of my invention include:
1) To show how backside electronic addressing circuitry could be interfaced to electrostatic shutter mosaics.
2) To identify how a backside electronic interface to electrostatic shutter mosaics enhances performance capabilities of deformable mirror devices.
3) To introduce an active matrix addressing configuration which could be utilized with an electrostatic shutter mosaic modulator.
4) To show how the active matrix addressing configuration of my invention could enhance reliability by eliminating electrical crossovers networks in the switch matrix.
5) To introduce a wide variety of suitable means, which could be utilized in my invention, to affix deformable mirrors to the first face of a substrate, thereby expanding options for enhancing yields and performance capabilities of deformable mirror devices.

DESCRIPTION OF INVENTION

Figure 1:
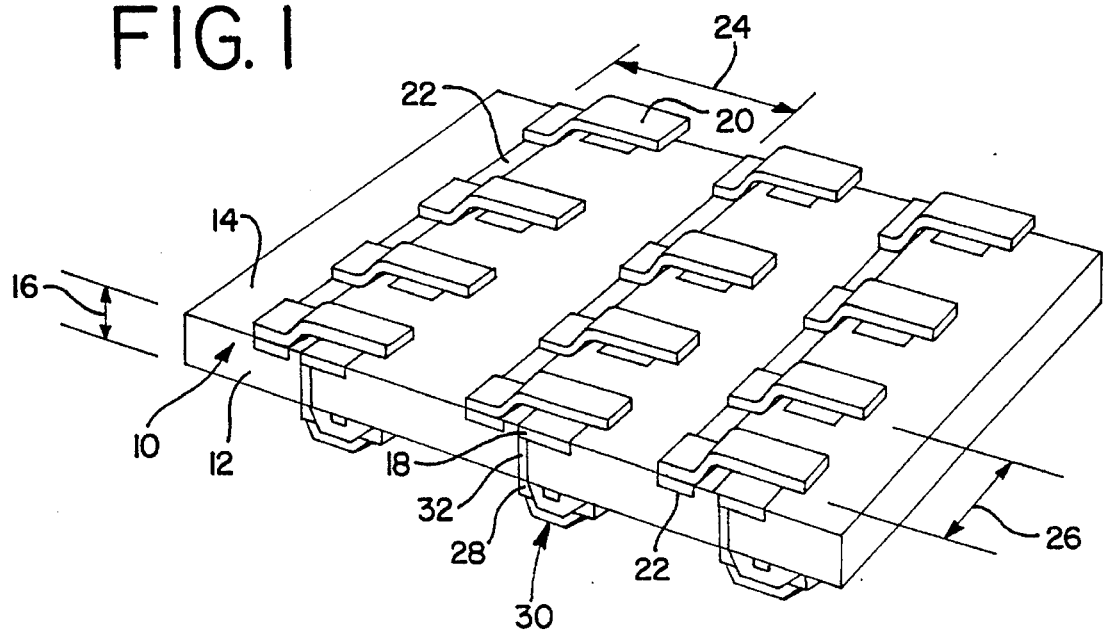
FIG. 1 shows a front face perspective of an electrostatic shutter mosaic modulator.

FIG. 1 shows a shutter mosaic modulator 10. Mosaic 10 contains a substrate 12. Substrate 12 contains a first major face 14 and a second major face. The second major face is not visible in this figure. The second major face is essentially parallel to the first major face. Face 14 and the second major face are separated by a substrate thickness 16. Mosaic 10 further includes a plurality of first electrodes 18 arranged in a matrix of p rows and q columns. Each first electrode 18 is overlapped by a respective deformable reflective conductor 20. As to be shown herein, several suitable forms exist for conductor 20. Each conductor 20 is affixed to face 14 by a suitable means. Several suitable means to affix each conductor 20 to face 14 have been provided in the references cited herein. Having conductors 20 overlay first electrodes 18 in a one to one correspondence yields a matrix of p rows and q columns of conductors 20. Every conductor 20 in each column q is electrically connected by a respective column buss 22. Adjacent busses 22 are separated by a first period 24. Period 24 is perpendicular to thickness 16. Adjacent conductors 20 in each column q are displaced by a second period 26. Second period 26 is perpendicular to period 24 and thickness 16. Each electrode 18 is electrically connected to a respective third switch terminal 28 of a respective switching element 30 by a feedthrough means 32.

Figure 2:
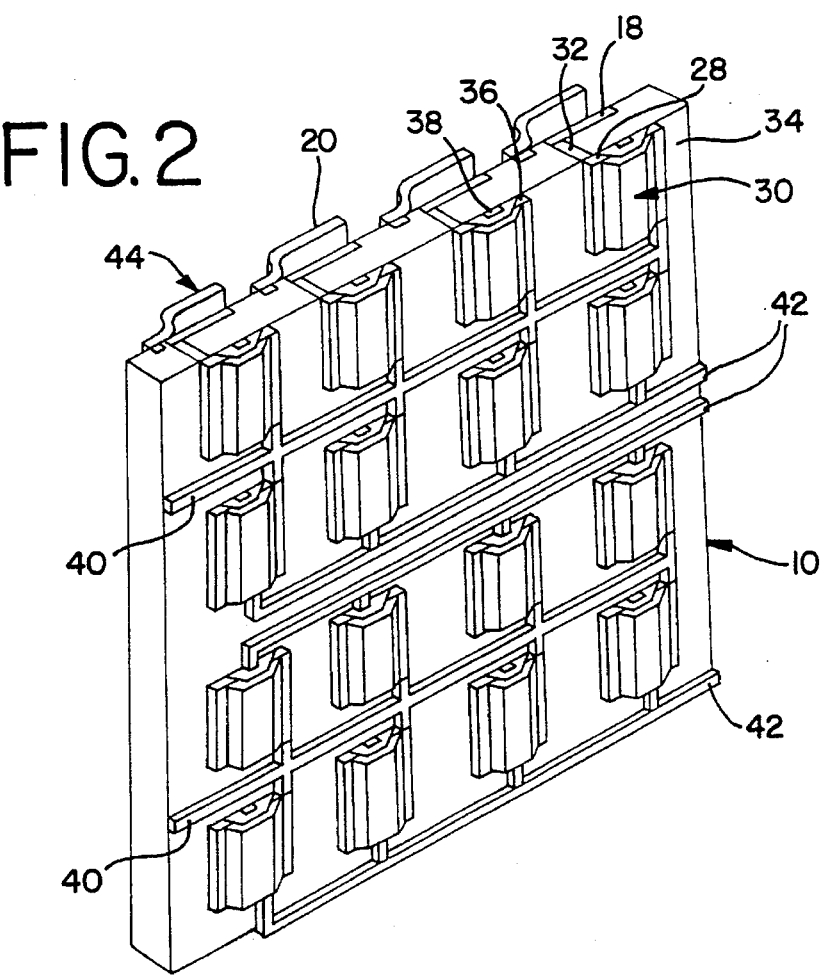
FIG. 2 shows a backside face perspective of an electrostatic shutter mosaic modulator.

FIG. 2 shows a second face (backside) perspective of mosaic 10. Several active matrix addressing configurations could be affixed to the second face of my invention. The following configuration is shown because it posses several desirable features to be described herein. This active switch matrix addressing configuration has been utilized in another patent application submitted by Craig D. Engle titled "Enhanced Surface Deformation Modulator" mailed on Sep. 26, 1992, and is hereby incorporated as reference. Mosaic 10 contains a second major face 34. Each first electrode 18 is electrically connected to a respective third switch terminal 28 of a respective switching element 30 by a feedthrough 32. Each switching element 30 is affixed to face 34 by a suitable means. Several suitable switching elements exist. Switching elements could be thin film transistors. Switching elements are drawn to depict thin film transistors. As well understood by those knowledgeable in the state of the art, thin film transistors could be vacuum deposited on face 34. Vacuum deposition of thin film transistors represents a suitable means to affix switching elements to face 34. Each first electrode 18 overlaps the respective switching element 30 thereby yielding a matrix of p rows and q columns of switching elements 30. Each switching element 30 further includes a first switch terminal 36 and a second switch terminal 38. A plurality of first busses 40 electrically connects every first terminal 36 in each row p to a common potential source. The common potential source is not shown in this figure. Every second terminal 38 in each row p is electrically connected by a respective second buss 42. The second buss associated with the top row is not shown in this figure for convenience. Each second buss 42 is parallel to every first buss 40. Having each first buss parallel to every second buss avoids electrical crossover networks in the active switch matrix. As well understood by those knowledgeable in the state of the art, avoiding electrical crossover networks enhances reliability and simplifies fabrication sequences associated with fabricating modulator 10. Each first electrode 18 and the respective conductor 20 form an electrostatic deformable pixel element 44. A suitable means is provided to control the potential difference of each pixel element 44 so as to deform each respective conductor 20 in accordance with an information bearing signal, thereby modulating a wavefront incident on mosaic 10. The wavefront is not shown in this figure. Suitable potential control means are well understood by those knowledgeable in the state of the art. Each second buss could be electrically connected to a row decoder module which applies a control signal to a selected second buss, changing the impedance state of every switching element connected by the selected second buss from a high impedance state to a low impedance state, enabling the potential difference of every pixel element in the selected row to be controlled by the potential difference between the common potential source and the potential applied to the respective column buss. The row decoder could provide a random select capability or a consecutive sequence. Methods of establishing potentials on the respective column busses are well understood by those knowledgeable in the state of the art. Circuitry for performing these functions could be contained in modules which could be bonded to the substrate, or fabricated as thin film components to be affixed to the first face and/or the second face of the substrate, in an appropriate fabrication sequence relative to the fabrication of the shutter elements. Interface circuitry is described in the cited references, and is not shown. Pixels could be operated in an analog or in a pulse width modulated manner.

The substrate of my invention could be an insulating substrate. The substrate could be a machinable photosensitive glass. Such materials are described in the article "Glass and Glass-Ceramics for Applications in Micromechanics" by D. Hulsenberg and R. Bruntsch, Journal of Non-Crystalline Solids 129 (1991) 199–205. Feedthroughs could be fabricated in the substrate by a variety of techniques. Suitable techniques are described in U.S. Pat. No. 2,266,349 to B. Wempe, Dec. 16, 1941. "Wire Mosaics" have been utilized in several display applications; see for instance "Reflective Liquid Crystal Television Display" by John a. Van Raalte, Proceedings of the IEEE, Vol. 56, No. 12, December 1968. Separating shutter elements and electronic circuitry by the substrate thickness is key to extending options for enhancing yield and performance capabilities of deformable mirror devices. Utilizing both faces of a substrate allows access to components affixed to the respective face with out unduly influencing components affixed to the other face. Processing options are greatly enhanced by this feature of my invention. Processing options required for components affixed to respective faces don't necessary have to be merged, providing greater freedom for fabricating respective components. Furthermore, as a consequence of dual face processing, any additional processing steps which could be required to ensure compatibility when integrating merged sequences for processing with one face access, as in prior art, could be avoided in my invention. This is key to enhancing yield and expanding performance options. The dual face processing capability of my invention enhances the capabilities of deformable mirror devices.

Although thin film components could be utilized as switching elements, several other switching elements could be utilized. It could be possible to utilize laser-induced crystallization of silicon islands affixed to the second face of the substrate to fabricate switching elements. This option for fabricating switching elements accentuates the flexibility inherent in my invention. Although a no crossover active matrix addressing configuration has been described, several advantages of my invention could be realized by other active switch matrix configurations, including configurations employing crossover networks.

Due to the latitude available with dual face processing of components in my invention, several suitable means exist for affixing deformable reflective conductors to the substrate. Means for affixing metal flaps has been provided in the references cited herein. Suitable affixing means further includes separating the conductor from the respective first electrode by a suitable distance. Distances and operating potential differences between first electrodes and the respective conductor for a variety of conductor geometries are well understood by those knowledgeable in the state of the art.

Deformable reflective conductors in my invention could be affixed to the first face by the use of insulating or semiconductor structures. Such structures could include $Sio_2$ cantilever beams. Such structures are identified in the references cited herein.

Polycrystalline microstructures could be utilized in my invention to affix conductors to the substrate. Suitable microstructures could include those described in the article "Polycrystalline Silicon Microstructures" by R. T. Howe, Micromaching and Micropackaging of Transducers, edited by C. D. Fung et al, Elsevier Science Publishers B. V. Amsterdam, 1985. Microstructures could include cantilever beams or microbridges. The fabrication flexibility inherent in my invention allows consideration of these suitable means to affix conductors to the first face, providing additional degrees of freedom for enhancing performance capabilities of deformable mirror devices. Alternative structures, such as those described above, could be utilized to influence modulation profiles generated by a deformable reflective conductor, to influence the resonant frequency associated with a conductor deformation, to reduce influence of fatigue. As well understood by those knowledgeable in the state of the art, such considerations could be important for several applications involving deformable mirror devices, including display applications.

Figure 3:
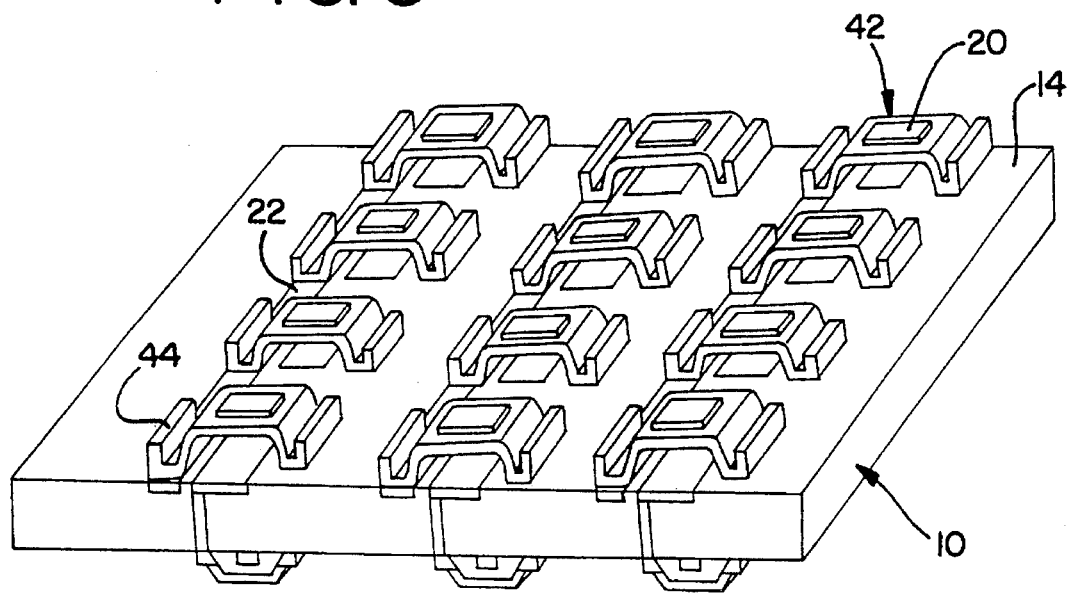
FIG. 3 shows alternative means for affixing deformable reflective conductors to the first face of a substrate which could be utilized with the shutter mosaic modulator configuration of my invention.

FIG. 3 shows another embodiment of my invention. FIG. 3 shows mosaic 10 containing a plurality of deformable reflective conductors 20. Each conductor 20 is affixed to a respective microbridge 42. Microbridge 42 is a suitable means to affix conductor 20 to first face 14. Conductor 20 could be vacuum deposited on bridge 42. Bridge 42 further includes a first bridge support 44. Every support 44 in each column q is electrically connected by the respective column buss 22. Suitable means to construct microbridges is provided in the references cited herein. As can be seen by this example, several suitable means exist to affix a deformable reflective conductor to the substrate.

Having addressing circuitry affixed to the second face of the substrate allows considerable flexibility in fabricating my invention. For instance, deformable reflective elements could be affixed by a variety of means to the substrate. Upon completion of any stage of this operation, including beyond depositing a spacer layer to the first face, electronic addressing circuitry could be affixed to the second face of the substrate. Such constructional procedures allow for testing at various stages of fabrication, enhancing quality control.

Due to the flexibility of my invention, several matrix configurations could be affixed to the second face of the substrate and achieve several advantages associated with my invention. Additional addressing configurations which could be utilized include configurations described in the article "Liquid Crystal Matrix Displays" by Bernard J. Lechner et al, Proceedings of the IEEE, Vol. 59, No. 11, November 1971. Additional information concerning some of the configurations discussed in that article include U.S. Pat. No. 3,654,606 to Frank Jerome Marlowe et al, March 1972, and U.S. Pat. No. 4,731,610 to Boron et al, Mar. 15, 1988. As described in U.S. Pat. No. 4,731,610, U.S. Pat. No. 3,654,606 has several drawbacks when utilized with liquid crystal modulators. However, as to be identified herein, configurations similar to U.S. Pat. No. 3,654,606 have several desirable attributes when employed in my invention. As quoted from the abstract of U.S. Pat. No. 5,142,405, to Hornbeck, Aug. 25, 1992, "Bidirectional operation of the bistable DMD is preferred over unidirectional operation because it eliminates contrast degradation caused by duty-factor effects and permits lower voltage operation." Configurations similar to U.S. Pat. No. 3,654,606 could be utilized to advantage in my invention. Furthermore, in a pulse width mode of operation, several of the "thresholding" and "nonlinearity effects" described in U.S. Pat. No. 4,731,610 are inconsequential when configurations similar to U.S. Pat. No. 3,654,606 are utilized in a pulse width modulated mode. Apparently, by failing to recognize this fact, there modes of operation were not contemplated for use with U.S. Pat. No. 4,731,610 or similar configurations. Configurations similar to U.S. Pat. No. 3,654,606 are quite complementary with my invention, including U.S. Pat. No. 4,731,610, because, in addition to the above described advantage, they eliminate electrical crossover networks, enhancing reliability.

Figure 4:
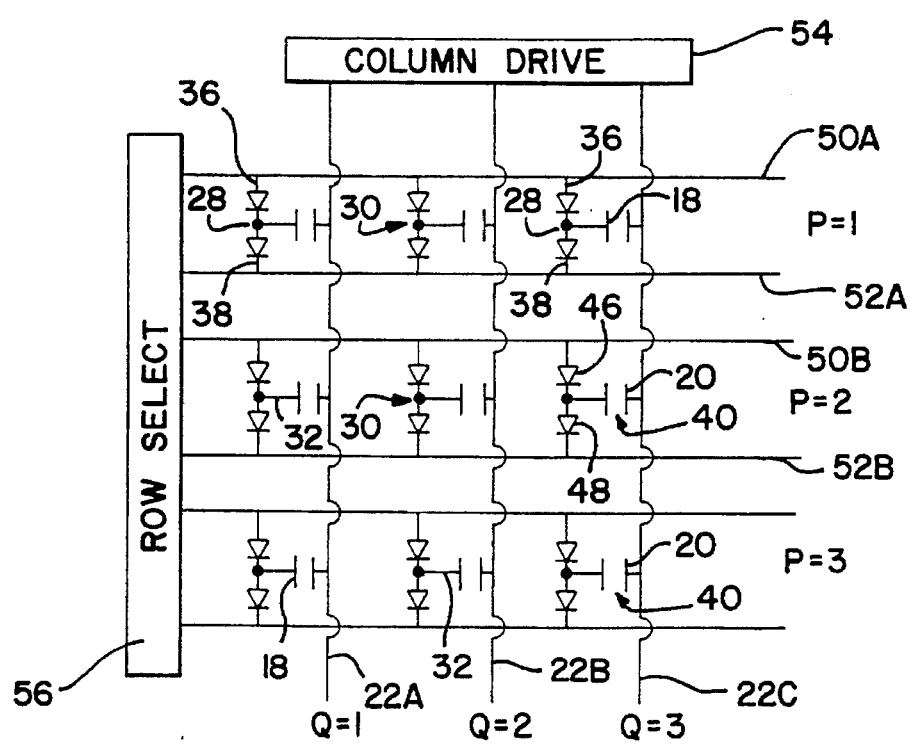
FIG. 4 shows a schematic of a matrix addressing configuration which could be utilized with my invention.

FIG. 4 shows a schematic of an active matrix addressing configuration which could be utilized with my invention. A plurality of first electrodes 18 are arranged into a matrix of p rows and q columns. Each pixel element 40 contains a respective electrode 18 and a respective conductor 20. Every conductor 20 in each column q is electrically connected by a respective column buss 22. Every first electrode 18 is electrically connected by a suitable feedthrough means 32 to a respective third terminal 28 of a respective switching element 30. Each switching element 30 is a pair of thresholding devices, a respective first thresholding device 46 and a respective second thresholding device 48. Every first thresholding device 46 in each row p is electrically connected to a respective first row elect buss 50 by a respective first switch terminal 36. Every second thresholding device 40 in each row p is electrically connected to a respective second row select buss 52 by a respective second terminal 38. Every first 50 buss is parallel to each second buss 52. Every first thresholding device 46 and every second thresholding devices 48 can be any threshold device of the type which provides a high impedance to current flow when reveresed biased and a comparatively low impedance to current flow when forward biased Threshold devices could take the form of diodes, and are coupled in a non-opposing series relation at the respective third terminal 28. A suitable potential control means to control the potential difference between each first electrode and the respective conductor includes a column driver block 54 and a row select address block 56. Operation of the suitable potential control means are well understood by those knowledgeable in the state of the art. Physical construction of such a matrix configuration is in accordance with my invention. Conductors are affixed by a suitable means to the first face of the substrate. Switching elements are affixed to the second face of the substrate by a suitable means. First electrodes overlap the respective switching elements, and first electrodes are overlapped by the respective conductors. Each first row select buss and each second row select buss is parallel to the first period.

SUMMARY, RAMIFICATIONS, AND SCOPE

Although the description above contains many specificities, these should not be construed as limiting the scope of the invention but merely providing illustrations of some of the presently preferred embodiments of this invention. For instance, several switching elements exists. See for example U.S. Pat. No. 4,731,610 to Baron et al Mar. 15, 1988. In addition, new transistor structures are being developed to serve a variety of applications. See the information in the article "Present and Future Applications of Amorphous Silicon and it's Alloys" by P. G. Comber, Journal of Non-Crystalline Solids 115 (1989) 1–13. Utilizing the information contained herein, several suitable switching elements may be utilized to realize the advantages of my invention.

Due to the flexibility of interfacing to my invention, negative potentials as well as positive potentials relative to the common potential source could be conveniently established on the column busses.

Several suitable means could be utilized to affix switching elements to the second face. Means could include affixing an insulating layer to the second face of the substrate. Such a layer could be phosphosilicate glass or silicon dioxide. Switching elements could be affixed to the exposed face of the insulating layer. The insulating layer could be etched to establish feedthroughs to electrically connect to the feedthroughs in the modulator substrate. Use of an insulating layer affixed to the insulating substrate of the modulator, could allow finer dimensions to be achieved with feedthroughs etched in the insulating layer as compared to the modulator substrate. This could allow the switching elements to overlap respective feedthroughs in the modulator substrate with out shorting the switching elements. This technique could enhance spatial resolution of the modulator.

Use of the insulating layer disposed between the modulator substrate and the switching elements, to assist in affixing switching elements to the substrate, could expand material options available for, and the type of, switching elements utilized in the matrix configuration. These considerations are well understood by those knowledgeable in the state of the art, and are available for consideration in my invention due to the flexibility inherent in my invention.

Examples could include laser-induced crystallization of silicon islands affixed to the second face.

As previously identified, several active switch matrix addressing configurations could be utilized with my invention. Although a no crossover matrix configuration provides additional advantages, it does not infer that a matrix configuration with crossovers is precluded from use in my invention. This is important because it is believed that no thin film active matrix addressing configuration affixed to the second face of the modulator substrate has been proposed for use with electrostatic shutter mosaic modulators. Accordingly, the suitable potential control means to control the potential difference between each first electrode and the respective conductor could be expanded in definition to include a suitable means to electrically connect each first switch terminal and each second switch terminals in a manner consistent with the desired matrix configuration. Two examples describing suitable means to electrically connect first switch terminals and second switch terminal in a matrix configuration have been provided herein. A matrix configuration containing crossovers is described as a "field effect transistor capacitor" addressed configuration of FIG. 13 in the article "Liquid Crystal Displays". Suitable potential control means could include a plurality of first terminal column electrodes to electrically connect every first switch terminal in each column to a respective column electrode voltage source (identified as C1, C2, etc. in FIG. 13). The suitable potential control means could further include a suitable means to hold each column buss at a respective fixed potential (identified as ground potential in FIG. 13). Suitable potential control means further includes electrically connecting every second terminal in each row by a respective row buss. A row of switching elements could be selected as previously described (as row pulse generators in FIG. 13), and each third switch terminal in the selected row could be charged to a potential related to the value of the respective column electrode voltage source. This procedure could be repeated for each row of pixel elements in the modulator. Considerations involved in determining which matrix configuration to utilize could involve the availability of masks for processing the active matrix.

When affixing first electrodes to the substrate, first electrodes could be recessed from the first surface and embedded in the substrate. Such techniques represents a suitable means to affix first electrode to the substrate. Affixing first electrodes by recessing first electrodes from the first face could provide several benefits. The functionality of the substrate could be increased by allowing the substrate to function as an insulating landing area for certain deformable conductor geometries. Increasing the functionality of the substrates reduces fabrication complexities, and could enhance yield. Recessing first electrodes from the first face could avoid shorting of certain conductor configurations when landing on the insulating substrate. Utilization of backside electronics avoids the requirement of extraneous light blocking components, since the substrate could perform this function, further increasing it's functionality.

As can be seen, several benefits are available with my invention. Accordingly, the scope of my invention should be determined not by the embodiments illustrated, but by the appended claims and their legal equivalents.

I claim:

1. An enhanced electrostatic light modulator for use in modulating an electromagnetic wavefront incident thereon in electronic to optical data conversion applications comprising:

an insulating substrate, a plurality of first electrodes arranged in a periodic two dimensional spatial distribution, each said first electrode is affixed to said substrate by a suitable means, overlapping each said first electrode is a respective reflective conductor, each said conductor is affixed to said substrate by a suitable conductor affixing means, a plurality of thin film transistors, each said transistor further includes a drain electrode, a gate electrode and a source electrode, each said first electrode is electrically connected by a suitable electrical interconnect means to a respective thin film transistor, each said transistor is affixed by a suitable transistor affixing means to said substrate, a suitable potential control means to apply between each said first electrode and the respective conductor a respective potential difference, whereby varying each said respective potential difference varies the separation between said respective conductor and the first electrode thereby modulating said wavefront incident thereon, efficiently, reliability so as to enhance commercial viability of said modulator.

2. The device of claim 1 wherein said insulating substrate further includes a first major surface and a second major surface, said first major surface and said second major surface are opposing surfaces, each said conductor is affixed to said first major surface by said suitable conductor affixing means.

3. The device of claim 2 wherein said periodic two dimensional spatial distribution further includes p rows and q columns of said first electrodes, said suitable potential control means further includes the gate electrodes of said transistors which are electrically connected to said first electrodes in each row p are electrically connected by a respective row select buss, each said respective row select buss is affixed to said substrate by a suitable buss means.

4. The device of claim 3 wherein each said transistor is affixed to said second major surface by said suitable transistor affixing means, each said respective row select buss is affixed to said second major surface by said suitable buss means.

5. The device of claim 4 wherein said suitable potential control means further includes the conductors which are overlapping said first electrodes in each column q are electrically connected, said conductor affixing means further includes means for electrically connecting the conductors in each column q so as to be electrically isolated from the conductors in every other column q.

6. The device of claim 5 wherein said suitable potential control means further includes a plurality of common busses electrically connecting the source electrodes of said transistors to a common potential source, each said common buss is affixed to said second major surface by a suitable means, each said common bus is essentially parallel to every said respective row select buss thereby avoiding electrical crossover networks, each said first electrode overlaps said respective thin film transistor thereby enhancing luminous efficiency and reliability.

7. The device of claim 6 wherein each said conductor is deformable.

8. An enhanced electrostatic light modulator for use in modulating an electromagnetic wavefront incident thereon in electronic to optical data conversion applications comprising:

an insulating substrate, a plurality of first electrodes arranged into a matrix of p rows and q columns, each said first electrode is affixed to said substrate by a suitable means, overlapping each said first electrode is a respective reflective conductor, each said conductor is affixed to said substrate by a suitable conductor affixing means, a plurality of thin film transistors, each said transistor further includes a drain electrode, a gate electrode and a source electrode, each said first electrode is electrically connected by a suitable electrical interconnect means to a respective thin film transistor, each said transistor is affixed by a suitable transistor affixing means to said substrate, a suitable potential control means to control an applied potential difference between each said first electrode and the respective conductor in accordance with an information bearing so as to enhance commercial viability of the modulator.

9. The device of claim 8 wherein said substrate further includes a first major surface and a second major surface, said first major surface and said second major surface are opposing surfaces, each said conductor is affixed to said first major surface by said suitable conductor affixing means.

10. The device of claim 9 wherein said suitable potential control means further includes electrically connecting the gate electrodes of said transistors which are electrically connected to said first electrodes in each row p by a respective row select buss, each said respective row select buss is affixed to said substrate by a suitable buss means.

11. The device of claim 10 wherein each said transistor is affixed to said second major surface by said suitable transistor affixing means, each said respective row select buss is affixed to said second major surface by said suitable buss means.

12. The device of claim 11 wherein said suitable potential control means further includes the conductors which are overlapping said first electrodes in each column q are electrically connected, said conductors affixing means further includes means for electrically connecting the conductors in each column q so as to electrically isolated from the conductors in every other column q.

13. The device of claim 12 wherein said suitable potential control means further includes a plurality of common busses electrically connecting the source electrodes of said transistors to a common potential source, each said common buss is affixed to said second major surface by a suitable means, each said common buss is essentially parallel to every said respective row select buss thereby avoiding electrical crossover networks, each said first electrode overlaps said respective thin film transistor thereby enhancing luminous efficiency and reliability.

14. The device of claim 13 wherein each said conductor is deformable.

15. An enhanced electrostatic spatial light modulator for use in modulating an electromagnetic wavefront incident thereon in electronic to optical data conversion applications comprising:

an insulating substrate, said substrate further includes a first major surface and a second major surface, said first major surface and said second major surface are opposing surfaces, a plurality of first electrodes arranged into a matrix of p rows and q columns, each said first electrode is affixed to said substrate by a suitable means, overlapping each said first electrode is a respective reflective conductor, each said conductor is affixed to said first major surface by a suitable conductor affixing means, the conductors which are overlapping said first electrodes in each column q are electrically connected, said suitable conductor affixing means further includes means for electrically connecting the conductors in each column q so as to be electrically isolated from the conductors in every other column q, a plurality of thin film transistors, each said thin film transistor further includes a drain electrode, a gate electrode and a source electrode, each said first electrode is electrically connected by a suitable feedthrough means to a respective thin film transistor, each said transistor is affixed by a suitable means to said second major surface, the gate electrodes of said transistors which are electrically connected to said first electrodes in each row p are electrically connected by a respective row select buss, each said respective row select buss is affixed by a suitable means to said second major surface, a plurality of common busses electrically connecting the source electrodes of said transistors to a common potential source, each said common buss is affixed to said second major surface by a suitable means, each said common buss is essentially parallel to every said respective row select buss thereby eliminating electrical crossover networks, a suitable potential control means to control an applied potential difference between each said first electrode and the respective conductor in accordance with an information bearing signal so as to enhance the commercial viability of the modulator.

16. The device of claim 12 wherein each said conductor is deformable, each said first electrode overlaps said respective transistor.

17. An enhanced electrostatic shutter mosaic modulator for use in modulating an electromagnetic wavefront incident thereon in electronic to optical data conversion applications comprising:

an insulating substrate, a plurality of first electrodes arranged into a matrix of p rows and q columns, each said first electrode is affixed to said substrate by a suitable means, overlapping each said first electrode is a respective reflective conductor, each said conductor is affixed to said substrate by a suitable conductor affixing means, the conductors which are overlapping said first electrodes in each column q are electrically connected, said suitable conductor affixing means further includes means for electrically connecting the conductors in each column q so as to be electrically isolated from the conductors in every other column q, a plurality of thin film transistors, each said transistor further includes a drain electrode, a gate electrode and a source electrode, each said first electrode is electrically connected by a suitable electrical interconnect means to a respective thin film transistor, each said transistor is affixed by a suitable transistor affixing means to said substrate, the gate electrodes of said transistors which are electrically connected to said first electrodes in each row p are electrically connected by a respective row select buss, each said respective row select buss is affixed to said substrate by a suitable buss means, a plurality of common busses electrically connecting the source electrodes of said transistors to a common potential source, each said common buss is affixed to said substrate by a suitable means, each said common buss is essentially parallel to every said respective row select buss, a suitable potential control means to control an applied potential difference between each said first electrode and the respective conductor in accordance with an information bearing signal so as to enhance reliability, and commercial viability of said modulator.

* * * * *